US008356244B2

(12) United States Patent
Vandermolen et al.

(10) Patent No.: US 8,356,244 B2
(45) Date of Patent: Jan. 15, 2013

(54) MANAGING CHANGES IN AIRCRAFT MAINTENANCE DATA

(75) Inventors: Kurt J. Vandermolen, Bellavue, WA (US); Peter R. Nelson, Puyallup, WA (US)

(73) Assignee: The Boeing Company, Chicago, IL (US)

( * ) Notice: Subject to any disclaimer, the term of this patent is extended or adjusted under 35 U.S.C. 154(b) by 825 days.

(21) Appl. No.: 11/471,128

(22) Filed: Jun. 20, 2006

(65) Prior Publication Data
US 2007/0294278 A1 Dec. 20, 2007

(51) Int. Cl.
*G06F 17/00* (2006.01)
(52) U.S. Cl. ........ 715/230; 707/793; 715/234; 715/243; 715/255
(58) Field of Classification Search .................. None
See application file for complete search history.

(56) References Cited

U.S. PATENT DOCUMENTS

| | | | | |
|---|---|---|---|---|
| 4,265,446 A | * | 5/1981 | McMillan et al. | 271/305 |
| 4,322,813 A | * | 3/1982 | Howard et al. | 700/73 |
| 4,494,149 A | * | 1/1985 | Furukawa | 358/404 |
| 4,503,407 A | * | 3/1985 | Ogura | 399/21 |
| 4,558,373 A | * | 12/1985 | Plasencia et al. | 358/484 |
| 4,803,614 A | * | 2/1989 | Banba et al. | 707/770 |
| 5,206,493 A | * | 4/1993 | Anderson et al. | 235/475 |
| 5,208,627 A | * | 5/1993 | Yoshihara et al. | 355/23 |
| 5,278,666 A | * | 1/1994 | Satomi et al. | 358/443 |
| 5,307,266 A | * | 4/1994 | Hayashi et al. | 715/201 |
| 5,311,429 A | * | 5/1994 | Tominaga | 704/10 |
| 5,327,341 A | * | 7/1994 | Whalen et al. | 705/3 |
| 5,355,444 A | * | 10/1994 | Chirico | 706/45 |
| 5,369,509 A | * | 11/1994 | Ko | 358/498 |
| 5,369,573 A | * | 11/1994 | Holloran et al. | 715/234 |
| 5,392,208 A | * | 2/1995 | Takita et al. | 700/83 |
| 5,404,518 A | * | 4/1995 | Gilbertson et al. | 1/1 |
| 5,457,792 A | * | 10/1995 | Virgil et al. | 1/1 |
| 5,491,325 A | * | 2/1996 | Huang et al. | 705/45 |
| 5,493,679 A | * | 2/1996 | Virgil et al. | 1/1 |
| 5,512,979 A | * | 4/1996 | Ogura | 399/8 |

(Continued)

FOREIGN PATENT DOCUMENTS
WO   PCT/US 07/12476   9/2008

OTHER PUBLICATIONS

Zisman, A., "An Overview of XML," Aug. 2000, Computer & Control Engineering Journal, vol. 11, Issue 4, pp. 165-167.*

(Continued)

*Primary Examiner* — Farhan Syed
(74) *Attorney, Agent, or Firm* — Parsons Behle & Latimer

(57) ABSTRACT

Airline operator-customers manage aircraft maintenance data for fleets of commercial aircraft using a suite of electronic maintenance tools that are delivered to the customers over the Internet and viewed with a web browser. The maintenance tool suite includes an authoring module that allows customers to create, edit and manage both OEM originated aircraft maintenance data and the customers' own data within a fully integrated environment running as a web application over the Internet. The authoring module combines workflow, XML authoring and editing, import/export of the data, change reconciliation, and publishing of airline customer authored documents, airline customer authored changes, OEM Temporary Revisions, and OEM aircraft maintenance documents into a single integrated web application using XML as the maintenance document format. The use of XML as the native format of the aircraft maintenance data allows the customers to reuse the data in a variety of ways.

24 Claims, 12 Drawing Sheets

U.S. PATENT DOCUMENTS

| | | | |
|---|---|---|---|
| 5,517,911 A * | 5/1996 | Rendell et al. | 101/72 |
| 5,605,105 A * | 2/1997 | Clark et al. | 111/127 |
| 5,694,608 A * | 12/1997 | Shostak | 715/236 |
| 5,983,267 A * | 11/1999 | Shklar et al. | 709/217 |
| 6,108,492 A * | 8/2000 | Miyachi | 358/1.15 |
| 6,233,341 B1 * | 5/2001 | Riggins | 380/277 |
| 6,263,265 B1 * | 7/2001 | Fera | 701/19 |
| 6,363,421 B2 * | 3/2002 | Barker et al. | 709/223 |
| 6,421,727 B1 * | 7/2002 | Reifer et al. | 709/225 |
| 6,473,788 B1 * | 10/2002 | Kim et al. | 709/209 |
| 6,795,798 B2 * | 9/2004 | Eryurek et al. | 702/188 |
| 6,963,556 B1 * | 11/2005 | Goldman et al. | 370/352 |
| 6,965,855 B1 * | 11/2005 | Burbridge et al. | 703/22 |
| 7,013,306 B1 * | 3/2006 | Turba et al. | 1/1 |
| 7,082,403 B2 * | 7/2006 | Wagner et al. | 705/7.25 |
| 7,093,760 B1 * | 8/2006 | Collins, Jr. | 235/462.01 |
| 7,110,758 B2 * | 9/2006 | Uchino et al. | 455/426.2 |
| 7,139,696 B2 * | 11/2006 | Tokieda et al. | 704/8 |
| 7,162,534 B2 * | 1/2007 | Schleiss et al. | 709/232 |
| 7,194,323 B2 * | 3/2007 | Kritt et al. | 700/97 |
| 7,254,581 B2 * | 8/2007 | Johnson et al. | 707/627 |
| 7,545,526 B2 * | 6/2009 | Onuma | 358/1.15 |
| 7,761,200 B2 * | 7/2010 | Avery et al. | 701/29.3 |
| 7,908,316 B2 * | 3/2011 | Butler | 709/203 |
| 8,051,379 B2 * | 11/2011 | Iwata et al. | 715/744 |
| 8,121,903 B2 * | 2/2012 | Gould | 705/26.35 |
| 2001/0052006 A1 * | 12/2001 | Barker et al. | 709/223 |
| 2002/0120549 A1 * | 8/2002 | Yang | 705/37 |
| 2004/0167907 A1 * | 8/2004 | Wakefield et al. | 707/100 |
| 2005/0240555 A1 * | 10/2005 | Wilde et al. | 707/1 |
| 2006/0089846 A1 * | 4/2006 | Middlebrook | 705/1 |
| 2007/0239762 A1 * | 10/2007 | Farahbod | 707/102 |

OTHER PUBLICATIONS

Collard, Michael, L., et al., "Supporting Document and Data Views of Source Code," Nov. 8-9, 2002, ACM DocEng' 02, pp. 34-41.*

* cited by examiner

Figure 5

Maintenance Performance Toolbox

| Main | Systems | Structures | Library | Document Viewer | Authoring | Tasks |

Home | Site Map | Contact Us | Help | My Account | Logoff

1 Choose a Category

Search all Categories [    ] (Go) Tip

- Maintenance
- BVT Group
- BVT Test Below (Add) (Delete)

2 Document List

Search Selected [    ] (Go) Tip    Search by Reference [    ] (Go) Tip    Customer Efficiency Code [None]    (Change Airplane)

| | Document Abbreviation (doc type) | Full Document Name | Revision Number | Revision Date | Info |
|---|---|---|---|---|---|
| ☐ | msn.com | testmsn | 465464 | 10-Aug-2005 | ⓘ |
| ☐ | AIPC | AIRCRAFT ILLUSTRATED PARTS CATALOG | 17 | 10-Jun-2005 | ⓘ |
| ☐ | AMM | AIRCRAFT MAINTENANCE MANUAL PART II | 27 | 10-Jun-2005 | ⓘ |
| ☐ | AMM | AIRCRAFT MAINTENANCE MANUAL PART II | 27 | 10-Jun-2005 | ⓘ |
| ☐ | FIM | COMBINED FAULT REPORTING AND FAULT ISOLATION MANUAL | 27 | 10-Jun-2005 | ⓘ |
| ☐ | FIM | COMBINED FAULT REPORTING AND FAULT ISOLATION MANUAL | 27 | 10-Jun-2005 | ⓘ |
| ☐ | SDS | AIRCRAFT MAINTENANCE MANUAL, PART I | 27 | 10-Jun-2005 | ⓘ |
| ☐ | SDS | AIRCRAFT MAINTENANCE MANUAL, PART I | 27 | 10-Jun-2005 | ⓘ |
| ☐ | SDS | STRUCTURAL REPAIR MANUAL | 22 | 10-Jul-2005 | ⓘ |
| ☐ | SRM | STRUCTURAL REPAIR MANUAL | 24 | 10-Jul-2005 | ⓘ |
| ☐ | SRM | STRUCTURAL REPAIR MANUAL | 14 | 10-Jul-2005 | ⓘ |
| ☐ | SRM | STRUCTURAL REPAIR MANUAL | 26 | 10-Jul-2005 | ⓘ |

(Add Link) (Remove Link) (Create Backup)

MANAGING CHANGES IN AIRCRAFT MAINTENANCE DATA

FIELD OF THE INVENTION

This invention generally relates to the management of data involving maintenance of equipment, and deals more particularly with creating, editing and managing maintenance data, especially for fleets of commercial aircraft.

BACKGROUND OF THE INVENTION

Maintenance of commercial aircraft requires the coordination of multiple services and part suppliers, and the exchange of information relating to components from the aircraft that require service, maintenance or replacement. Aircraft OEMs (original equipment manufacturers) typically supply customers with a variety of documents and information that are used by the customers to perform aircraft maintenance, and manage related maintenance documents. These documents include, by way of example, part catalogs, maintenance manuals, wiring diagrams, maintenance training manuals, in-service activity reports, repair records and service letters.

It is obviously necessary for the OEM to control the original documents so that their integrity and accuracy can be maintained. However, airline operator customers and maintenance providers often have a need to make certain types of changes to the OEM supplied maintenance documents, either for their own business purposes, or to satisfy regulatory requirements. In some cases, the customers may also wish to add or append their own data to the OEM supplied maintenance documents.

In the past, the customer's ability to access OEM supplied maintenance documents was limited, since not all of these documents and related data were readily accessible from the OEM in a single delivery vehicle. Moreover, depending on the type of maintenance document or data, the customer could not easily edit the documents or data, or comprehensively manage the data once modifications were made.

Accordingly, there is a need for a system for creating, editing and managing maintenance data which overcomes each of the deficiencies mentioned above. The present invention is directed toward satisfying this need.

SUMMARY OF THE INVENTION

In accordance with one aspect of the invention, a method is provided for managing maintenance data for equipment, comprising the steps of: authoring original maintenance data relating to the equipment; delivering a web application to an editing site over a network; delivering the original maintenance data to the editing site in XML format using the web application; and, performing XML editing of the original maintenance data at the editing site. The web application is preferably delivered over the Internet, and viewed using a web browser. The method may also include importing and exporting data related to the equipment using the web application, and using the imported/exported data to assist in editing of the original maintenance data. The method may further include reusing the edited maintenance data, reconciling edits to the data and publishing the edited maintenance data using the web application.

In accordance with another aspect of the invention, a method is provided for creating and managing documents containing maintenance data for aircraft, comprising the steps of: creating original maintenance documents for the aircraft; delivering a web application to a user site over the internet; delivering the original maintenance documents to the user site using the web application; and, editing the original maintenance documents at the user site. The editing step may include changing existing data in the maintenance documents or appending additional data to the documents. The method may further comprise the steps of reusing maintenance documents that have been edited, scheduling the edited maintenance documents to be published at a pre-selected time, and publishing the edited maintenance documents at the scheduled time. The maintenance documents are preferably delivered to the user site and edited using XML.

According to still another aspect of the invention, a system is provided for managing changes in maintenance data for aircraft, comprising: a host website; aircraft maintenance data accessible at the host website in XML format; a user site connected to the host site by a network; a web application for editing the original maintenance data using XML; and, a web browser for viewing the web application over the network and making changes to the maintenance data. File storage is provided for storing the maintenance data, which may include data describing maintenance tasks, and documents describing parts used in the maintenance of the aircraft. A scheduler is provided to publish the edited maintenance data at a preselected time. The web application preferably comprises Spring Web Application framework that includes a workflow engine for specifying a process for reviewing and approving the edited maintenance data. The web application is provided with an embedded editor for editing the maintenance data.

The system of the present invention advantageously allows aircraft customers and maintenance providers to create, edit and manage both OEM originated aircraft maintenance data and the customers' own data within a fully integrated environment running as a web application over the Internet. Airline customer authored maintenance data changes can be seamlessly incorporated into the OEM maintenance data. Another feature of the invention is that it combines workflow (review and approval), XML authoring and editing, import/export of the data, change reconciliation, and publishing of airline customer authored documents, airline customer authored changes, OEM Temporary Revisions, and OEM aircraft maintenance documents into a single integrated web application using XML as the maintenance document format. By using XML as the native format of the aircraft maintenance data, aircraft customers may reuse the data in a variety of ways.

Various additional objects, features and advantages of the present invention can be more fully appreciated with reference to the detailed description and accompanying drawings that follow.

BRIEF DESCRIPTION OF THE DRAWINGS

FIG. 5 is a screen capture showing typical contents of the library module which forms part of the MPT.

DETAILED DESCRIPTION OF THE PREFERRED EMBODIMENTS

Figure 1:
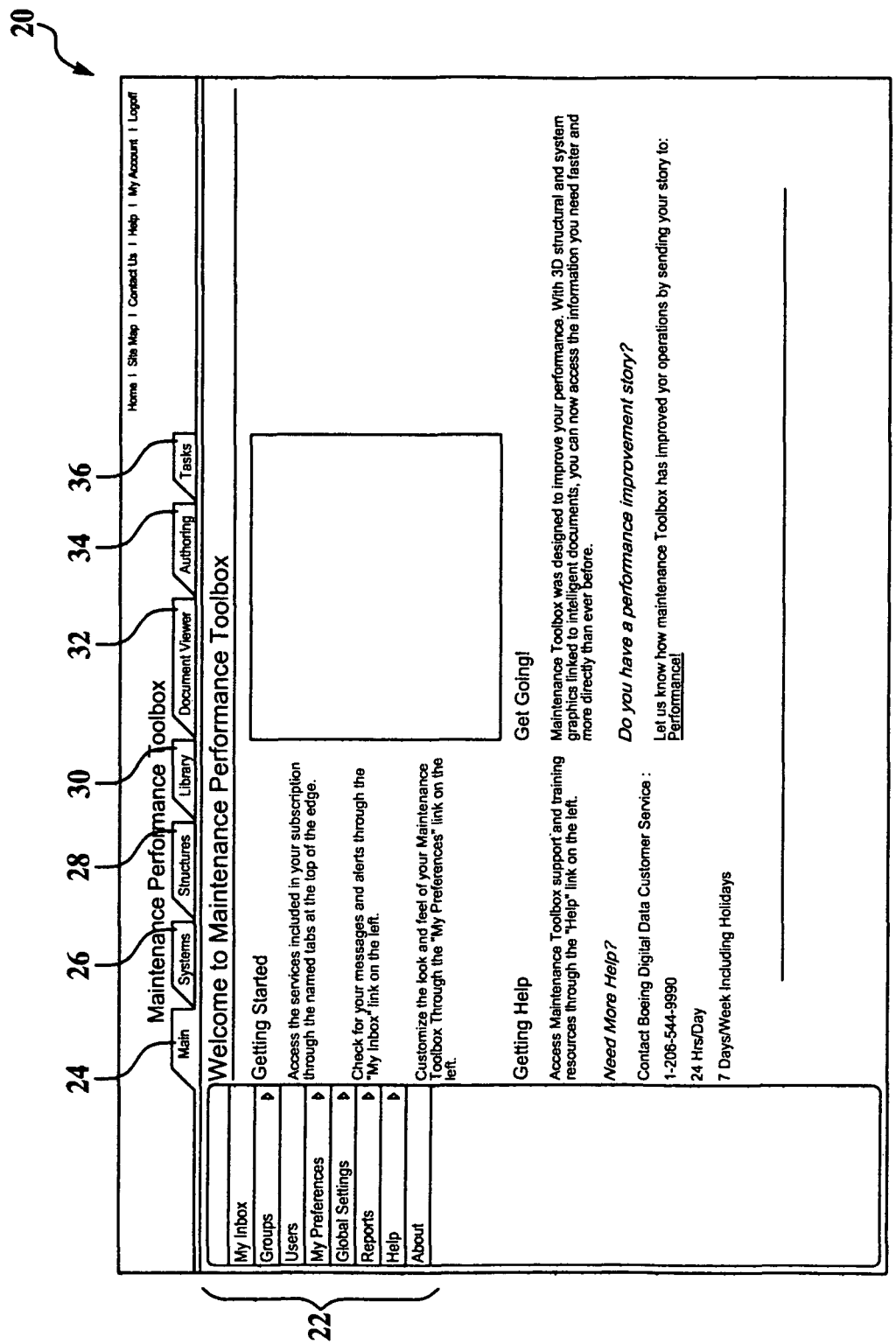
FIG. 1 is a screen capture of a maintenance performance toolbox (MPT) web application useful in providing service and maintenance for aircraft, which includes the maintenance data management system of the present invention.

The present invention broadly relates to a system for creating, editing and managing data relating to the maintenance of equipment. In the presently illustrated embodiment, the equipment is disclosed as comprising fleets of commercial aircraft supplied by OEM (Original Equipment Manufacturers) to airline owners and operators. The maintenance data created by the OEMs are used by a variety of personnel who provide maintenance and related services to the airline owners and operators. As will be discussed below in more detail, this maintenance data comprises a wide range of documents and information, including, for example, part catalogs diagrams, repair history, training manuals, etc.

A variety of tools have been created to aid maintenance personnel in carrying out and managing maintenance services. One such tool is available from the Boeing Company, and is referred to as a maintenance performance toolbox (MPT). The MPT is more fully described in US patent application publication number US2003/0187823 A1 published Oct. 2, 2003, and US patent application publication number US2005/0177540 A1, published Aug. 11, 2005, the entire contents of both of which are incorporated by reference herein.

Briefly the MPT uses 3-D airframe models and schematics of aircraft systems as "graphical" tables of content that enable point and click access to all of the information related to a specific aircraft location or component. Advanced data mining techniques and search capabilities are used by the MPT to collect relevant information (e.g. fault code lookup, repair history, maintenance procedures, part numbers, maintenance tasks) into the troubleshooting process. The MPT gives maintenance personnel such as mechanics, fast and efficient access to technical information using intuitive navigation techniques that helps the user construct a mental image of the solution and takes the user directly to applicable information. Real time information updates ensure that the customer has access to the most current technical information. The MPT is also useful in assisting aircraft users to manage parts and materials.

The present invention is useful with maintenance tools such as the MPT to allow customers (aircraft owners and operators) to alter (edit) and supplement maintenance documents and data of the type used in the MPT, for the purpose of meeting regulatory requirements, or for helping the customer to operate its business more efficiently.

The present invention is embodied in an authoring module, which may form part of a system such as the MPT, that combines workflow (review and approval), XML authoring and editing, import/export of data, change reconciliation and publishing of OEM aircraft authored documents, OEM authored changes, OEM Temporary Revisions and OEM maintenance documents into a single, integrated internet-delivered web application using XML as the maintenance document format. By using XML as the native format of the maintenance data, the customers may reuse the data in a variety of ways, including editing the data and appending additional information to the data.

XML (Extensible Markup Language) is a flexible way to create common information formats and share both the format and the data on the world wide web, intranets and elsewhere. XML is similar to HTML in that both contain markup symbols to describe the contents of the page or file. HTML, however, describes the content of a web page only in terms of how it is to be displayed and interacted with. XML describes the contents in terms of what data is described. This means that an XML file can be processed purely as data by a program or it can be stored with similar data on another computer or it can be displayed.

Referring now to FIG. 1, a screen display 20 is shown of the main page of the MPT which is delivered as a web application via a network such as the Internet and viewed with a web browser. On the left side of the screen 20, a menu 22 is provided to allow the user to access various features of the MPT, such as the user's preferences, settings, reports and help. Along the top of the screen 20, clickable tabs 24-36 are provided which represent hot linked modules in the MPT. These tabs include the main page 24, systems 26, structures 28, library 30, documents viewer 32, authoring module 34, and tasks 36. As will be discussed below, the present invention relates particularly to the authoring module 34.

Figure 2:
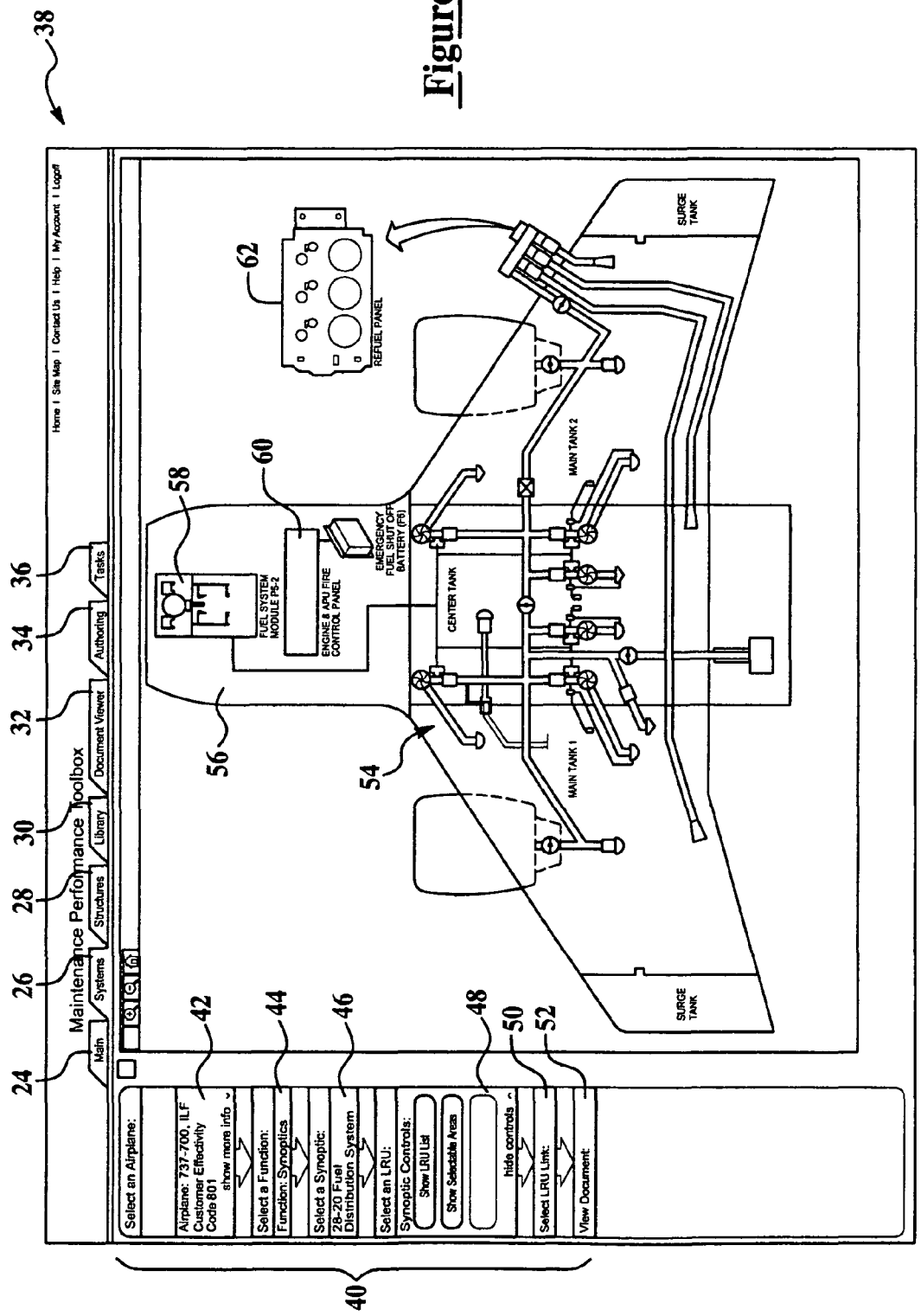
FIG. 2 is a screen capture showing a synoptic view of a system on a typical aircraft using the MPT web application.

FIG. 2 shows a typical screen display in the systems 26 module, in which a sub-menu 40 of hot buttons is shown along the left hand side of the screen that allow the user to select systems on the aircraft to be displayed. Menu item 42 allows the user to select a particular aircraft, while menu item 44 permits the user to display a particular function, which in the illustrated case is synoptics. Menu item 46 permits displaying a particular synoptic, which in the illustrated case is a fuel distribution system. Menu item 48 allows the user to select a particular LRU (Line Replaceable Unit). Menu item 50 provides a link to the selected LRU and menu item 52 allows the user to view related documents. As shown in the main window of screen display 38, a synoptic depicts the fuel distribution 54 in a selected aircraft 56 along with related components, which in this case comprise a fuel system module 58, a control panel 60 and a refueling panel 62.

Figure 3:
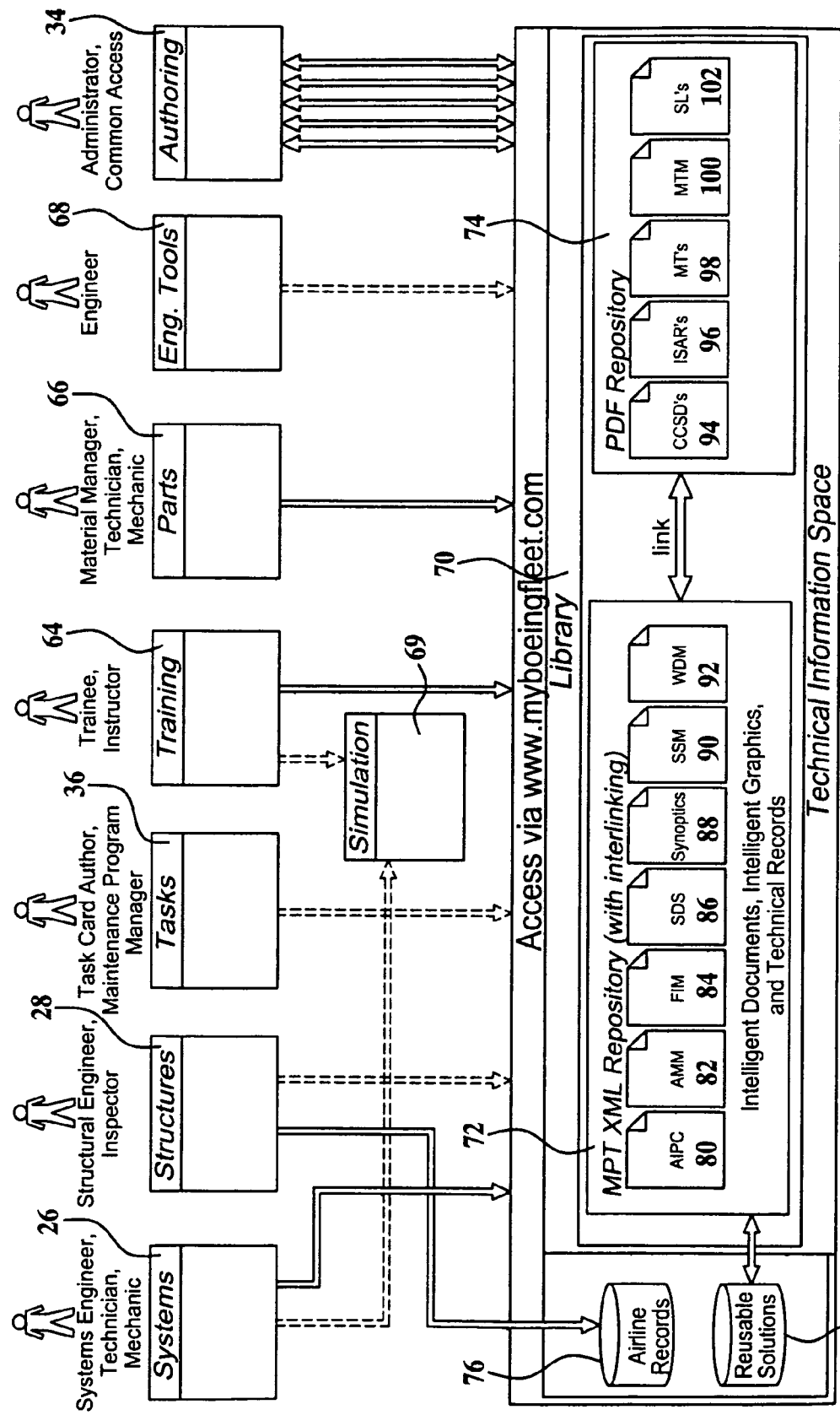
FIG. 3 is a combined block and diagrammatic view of the MPT which includes an authoring module forming part of the present invention.

Referring now also to FIG. 3, the functional modules of the MPT are shown across the top of the figure in the form of user clickable tabs, comprising systems 26, structures 28, tasks 36, training 64, parts 66, engineering tools 68, and authoring 34. These functional modules have access to a library 70 of electronically stored technical information and documents which will be discussed below in more detail.

The systems module 26 is typically used by systems engineers, technicians and maintenance mechanics to view and gain information about systems on the aircraft. Using the systems module 26, users can gain access to a simulation program 69 which simulates the operation of various systems on the aircraft. Using the structures module 28, users can gain access to stored airline records 76 which typically include repair records and maintenance histories. Aircraft system diagrams (synoptics) can be used to retrieve LRU specific information such as maintenance procedures, troubleshooting information, part and data, wiring diagrams, maintenance tips, service bulletins, etc. Specialized fleet-specific searches can be used to locate troubleshooting and part number information.

The structures module 28 manages and maintains a comprehensive repair history database, which includes repair details, supporting documentation, reference information and repair locations in spatial 3-D models. Searches can be conducted of repairs on specific aircraft (tail numbers), across minor models of aircraft or across entire fleets. The structures module 28 is linked to the library 70 to provide access to all technical documents and engineering data.

The tasks module 36, shown in FIG. 1, is used to create and manage task cards that are employed in carrying out maintenance services, and synchronize AMM revisions. Provision is made for a full audit trail and regulatory reporting. Task cards can be assigned to specific aircraft for all locations and schedules, and are automatically delivered to a printer or maintenance provider system.

The training module 64 is used by trainees and instructors to provide training services which may require retrieval of information from the library 70 or use of the simulation program 69. The training module 64 provides up-to-date training information with access and navigations of the existing training media, new training media and MPT tutorials. The training module 64 also includes a quick access menu for LRUs as well a link to the desktop simulations 69.

The parts module 66 is used by material managers, technicians and mechanics to gain information about parts on the aircraft, particularly parts location and identification using a 3-D graphical model. The parts module 66 is integrated with MRO (Maintenance Repair Organizations) materials management systems for obtaining inventory information and/or for parts management system.

The engineering tools module 68 can be used by personnel such as engineers to perform engineering functions and calculations which require retrieval of data from the library 70. For example, the engineering module 68 permits a user to perform electrical load analyses and configuration management. The engineering module 68 also allows the user to analyze structural loads and repair stress for performing repairs outside of SRM (Structural Repair Manual) limits.

Finally, the authoring module 34 shown in FIG. 1 can be used by administrators and any other personnel, who use the other above mentioned modules to create, edit and manage maintenance information and documents. The authoring module 34 allows customers to incorporate their changes in major maintenance documents using a built in XML editor. The user may add supplemental information at any location and has the ability to control access and distribution of edited documents to end users. The authoring module 34 also allows the user to manage and reconcile revisions from the OEM, as well as create approval workflows that match the customer's business requirements.

The library 70 includes a repository 72 of interlinked XML documents, graphics and technical records, as well as a repository 74 of documents in PDF format. The XML repository 72 is linked with the PDF repository 74, and with a set of data comprising reusable solutions 78 which include an application that may use certain pieces of information from the MPT such as an aircraft selection or component. The library 70 effectively consolidates manufacturer and customer documents into a single source of information for multiple fleets of aircrafts, where major maintenance documents are maintained in XML format. Extensive use is made of hyperlinking for convenient navigation, and the documents are intelligently tagged for use by external applications.

The XML repository 72 comprises an airplane illustrated parts catalog (AIPC) 80, airplane maintenance manual (AMM) 82, fault isolation manual (FIM) 84, system description section (SDS) 86, synoptics 88, system schematics manual (SSM) 90 and wiring diagram manual (WDM) 92.

The PDF repository 74 comprises configuration change support data (CCSD) 94, in-service activities report (ISAR) 96, maintenance tips (MT's) 98, maintenance training manual (MTM) 100, and service letters (SL's) 102.

Figure 4:
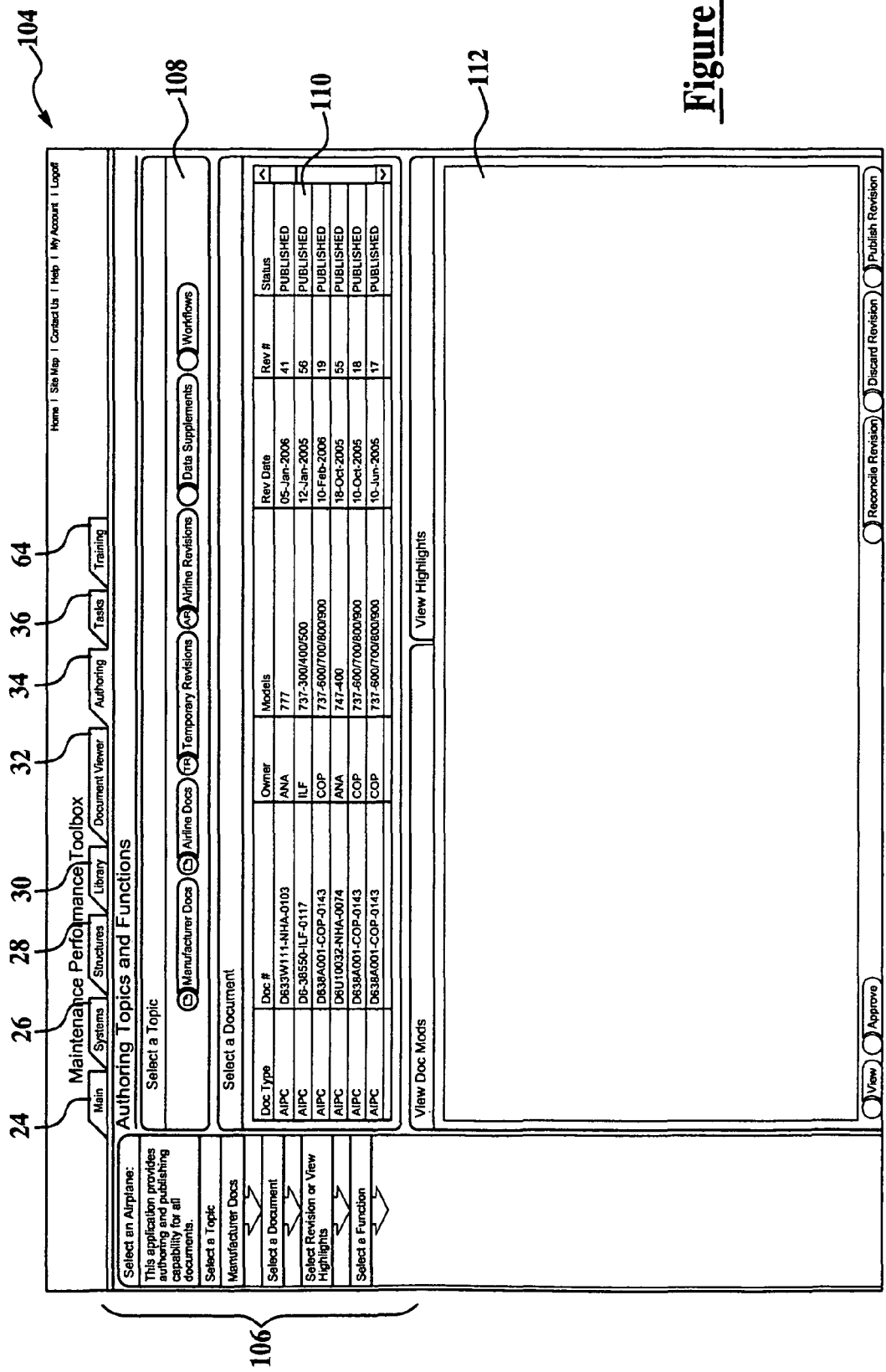
FIG. 4 is a screen capture showing a typical view displayed in the authoring module.

Selecting the authoring tab 34 (FIG. 1) results in a screen display 104 shown in FIG. 4 in which user tabs are displayed across the top of the screen. These tabs include main 24, systems 26, structures 28, library 30, document viewer 32, authoring 34, tasks 36 and training 64. A menu of user selectable functions 112 are provided along the left side of the screen display 104 that assist the user in navigating to a desired subject or location. A first window 108 enables the user to select a particular topic, such a particular category of documents, revisions and workflows. A second window 110 permits selection of a particular document of interest to the user and a third window 112 allows the user to view modifications of the selected document or related highlights.

Figure 6:
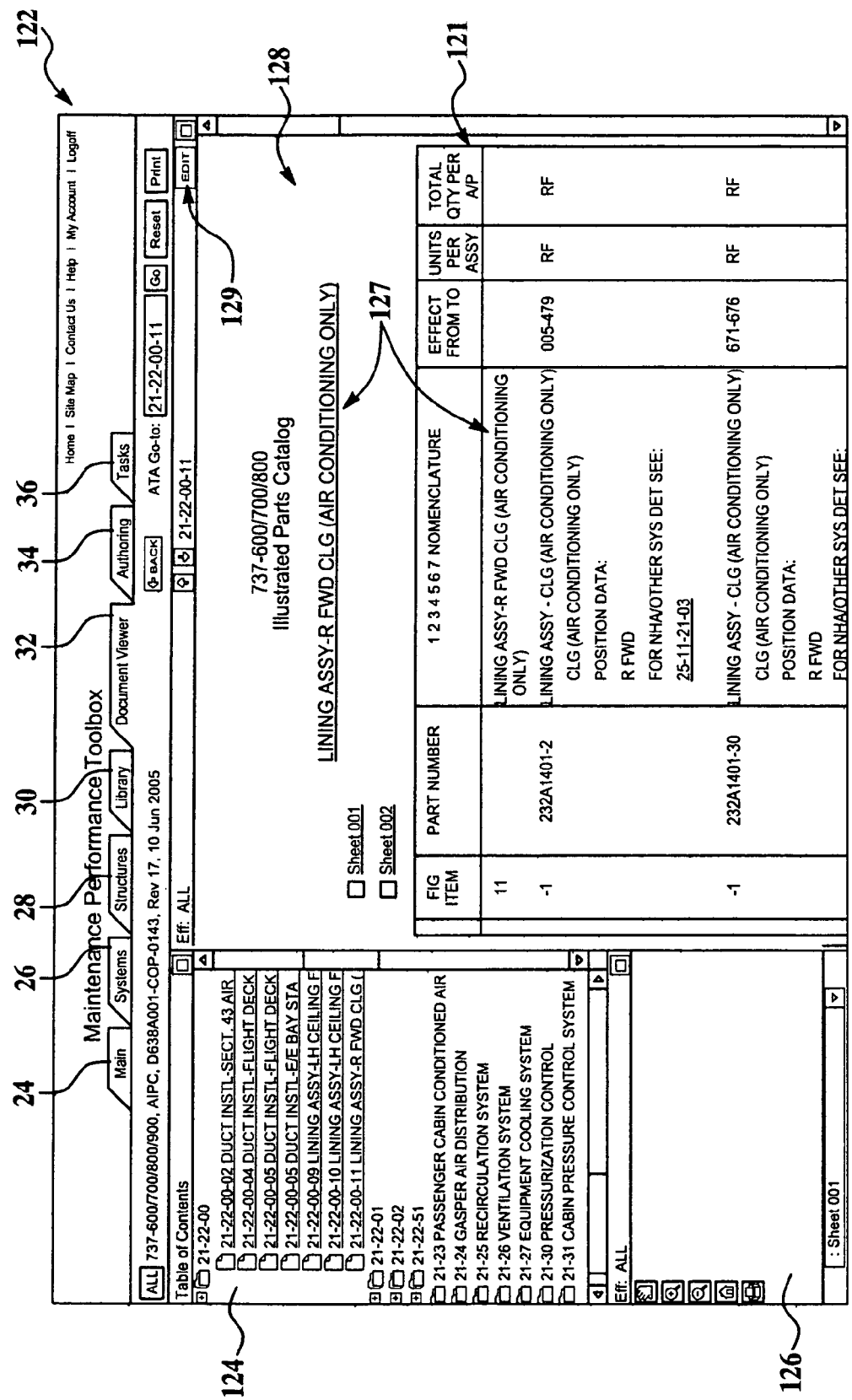
FIG. 6 is a screen capture showing part information displayed by a document viewer module that forms part of the MPT.

A typical example of how the authoring module 34 can be used to edit maintenance data will now be provided. Beginning with the screen 20 shown in FIG. 1, the user may, for example, click on the library tab 30 which results in a screen display 116 shown in FIG. 5. A window 118 provides the user with the choice of categories which in the present case, is maintenance. A window 120 on the right side of screen 116 provides a list of documents 121 that are available in the library 70. In the present example, the user might select, for example, the AIPC (Aircraft Illustrated Parts Catalog) choice in window 120 which results in display of screen 122 as shown in FIG. 6, in which a window 124 on the left hand side of the screen displays the table of contents of the AIPC. The user then selects one of the parts or assemblies in the table of contents, which in the illustrated example, comprises a lining assembly 127, the details of which are then shown in window 128. A third window 126 displays a perspective view of the selected lining assembly 127.

Figure 7:
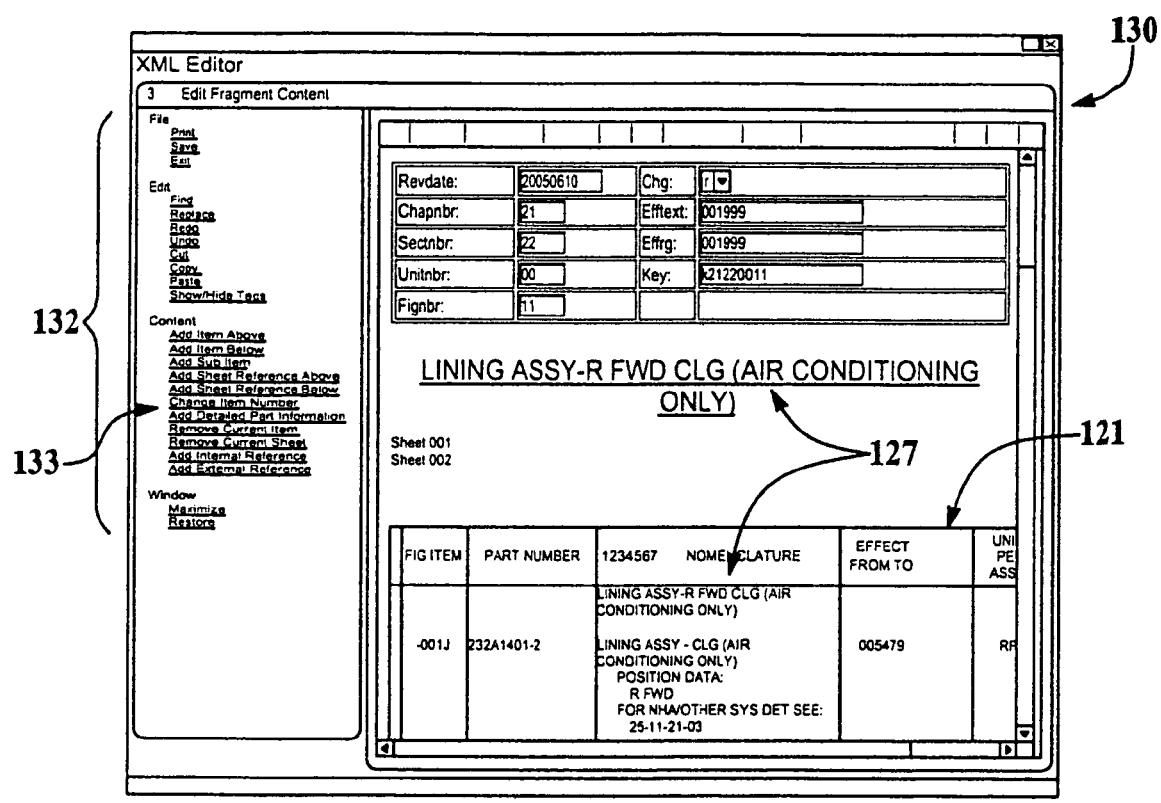
FIG. 7 is a screen capture showing the layout of the XML editor, and depicting how the maintenance data for the part shown in FIG. 6 can be edited.
Figure 8:
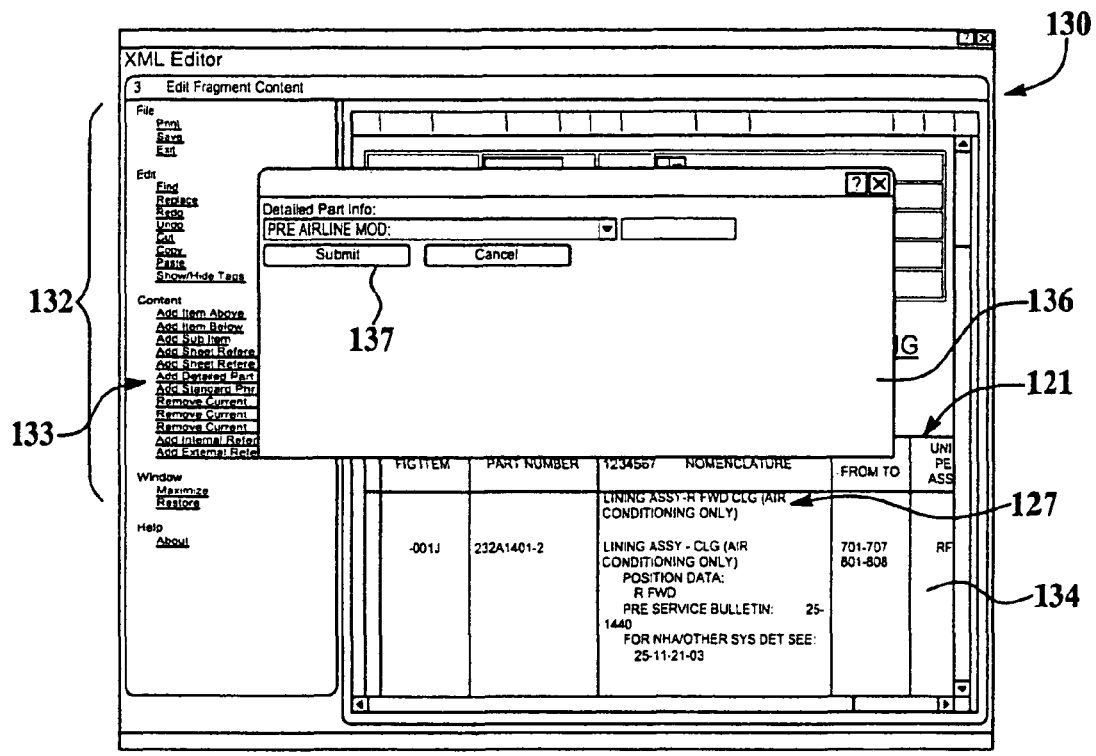
FIG. 8 is a view similar to FIG. 7 but showing a pop-up window used to submit user edits.
Figure 9:
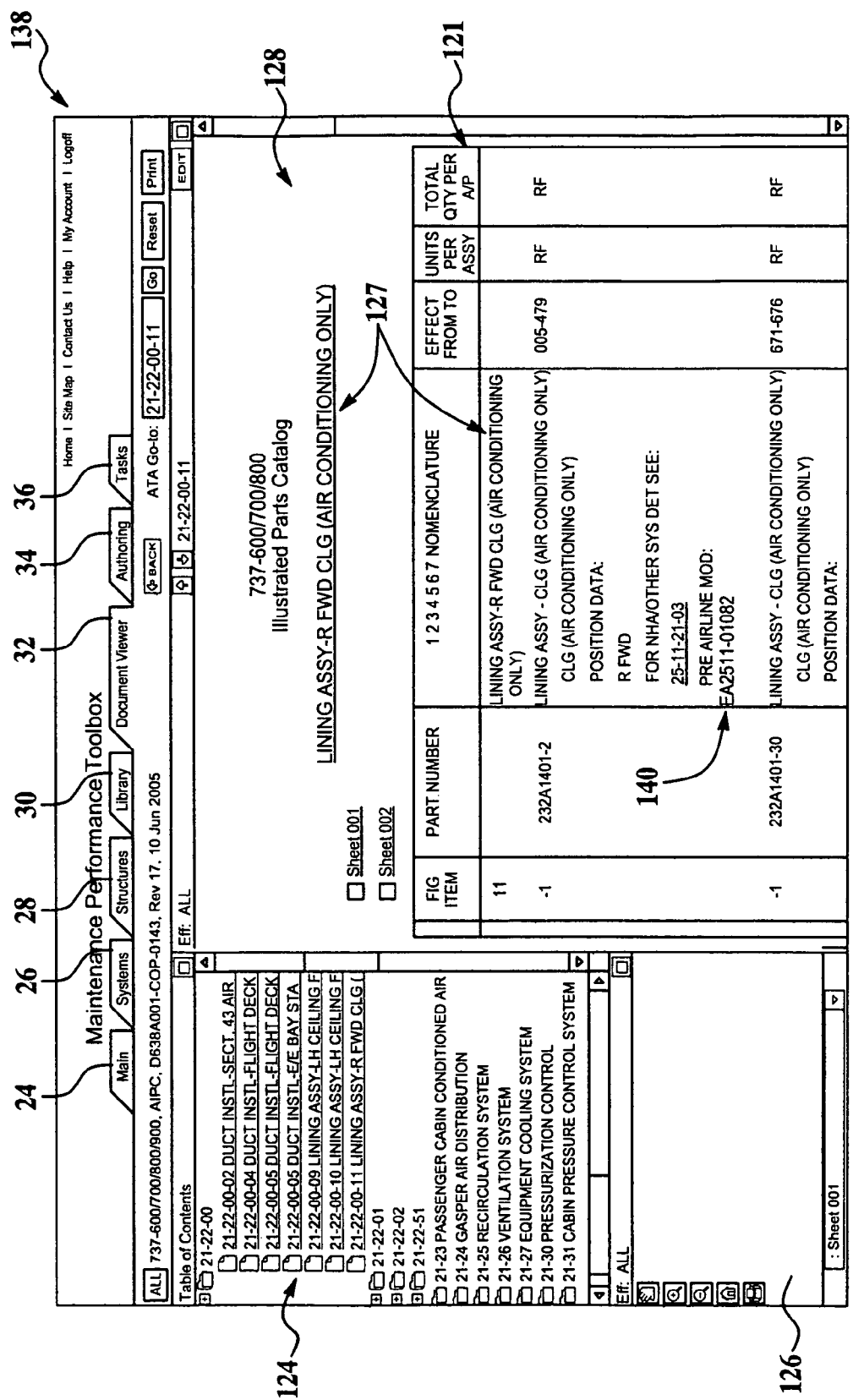
FIG. 9 is a view similar to FIG. 6, but showing how the edits made by the user can be highlighted to indicate data changes.

In order to edit the information shown in window 128, the user clicks on the edit button 129 shown in FIG. 6 which launches an XML editor screen 130 shown in FIG. 7. The XML editor provides the user with a list 132 of functions to choose from for altering the part information shown in a window 134, which in this case, are the details of the lining assembly 127. In the present example, it is assumed that the user selects the function "add detailed part information" 133 from the list 132 in order to add the customer's modification numbers to selected parts. Selecting the "add detailed part information" 133 from the function list 132 results in a dialog box 136 shown in FIG. 8 which allows the user to enter the information that is to be added. In the present example, a user has typed in "PRE AIRLINE MOD:EA2511-01082" as the part information to be added. The user then clicks the submit button 137, resulting in the additional information being added to the edited document. In order to verify that the change has been made, and review the changes, the user selects the document viewer 32 tab, resulting in the screen display 138 shown in FIG. 9, in which it can be seen that the newly added information is present, as shown by the numeral 140. The newly added information can be highlighted in a contrasting color in order to better show the data that has been changed.

Figure 10:
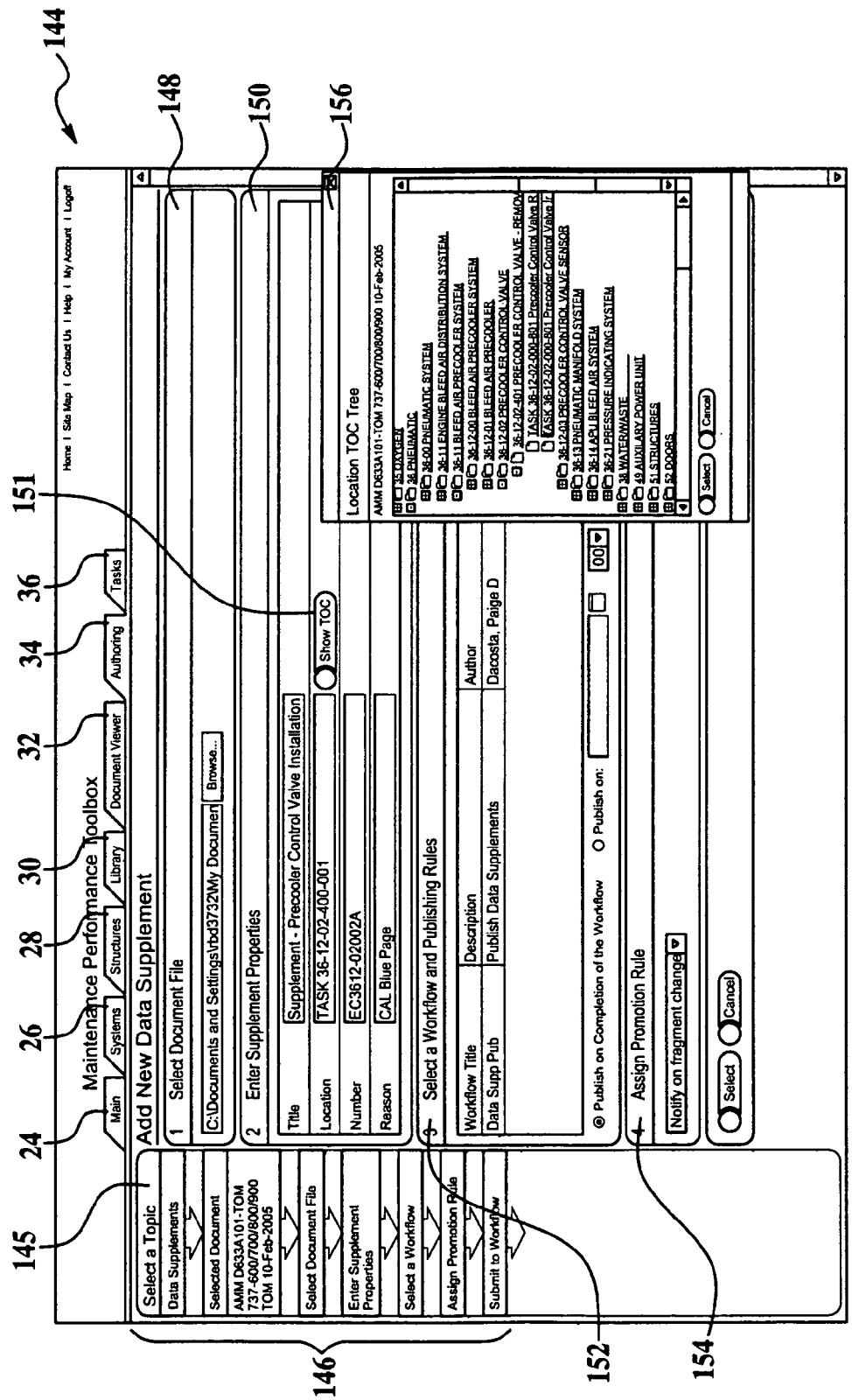
FIG. 10 is a screen capture in the authoring module, showing a first step in adding data to an OEM authored maintenance document.

In some cases, the user may wish to simply add its own data or information to that provided by the OEM. A brief example of how data can be added by the user will now be described, and in this connection, attention is directed to FIG. 10 in which a screen display 144 is shown corresponding to the authoring tab 34. As shown on the left side of the screen 144, the user is provided with a menu of functions 146, comprising "select a topic", "select document", "select document file", "enter supplement properties", "select a workflow", "assign promotion rule", and "submit workflow". The user selects the topic of "data supplements" 145 and then clicks on the selected document to choose a document to which information is to be added. This results in the display of a "select document file" window 148, following which a window 150 is displayed in which the user can enter the supplemental properties. A window 152 is provided to allow the user to select a workflow and rules for publishing the data supplements. As can be seen in window, 152 the user has the option of either publishing the data supplements upon completion of the workflow, or on a particular date and time specified by the user.

Figure 11:
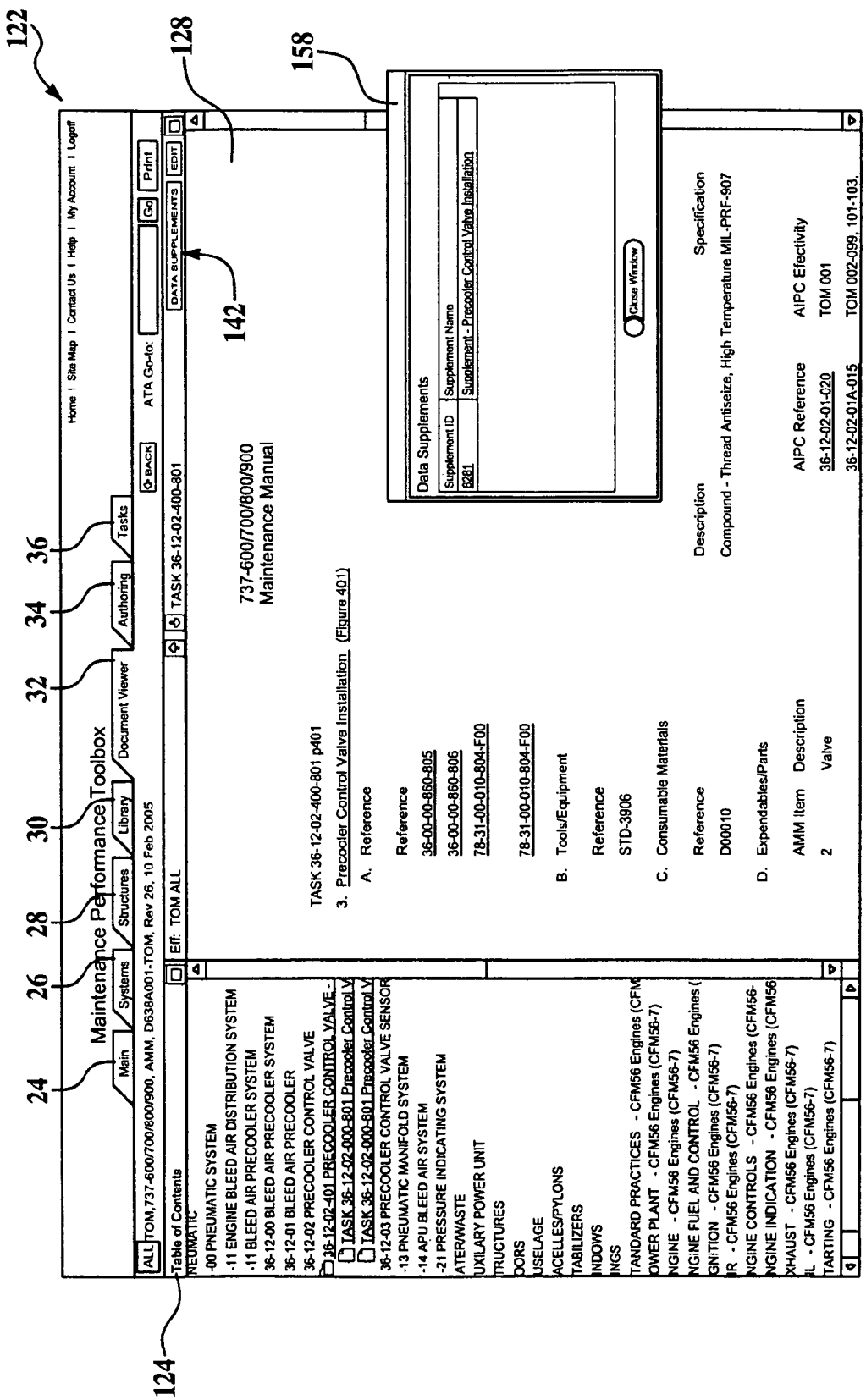
FIG. 11 is a screen capture of the document viewer in which an option is provided to view a list of data supplements.

A window 154 is provided to allow the user to assign promotion rules to the data supplement. If the user needs to revert to the table of contents of a parts catalog for example, a "show TOC" (table of contents) button 151 in window 150 can be clicked on, resulting in a pop-up window 156 which shows the location of the part in the TOC tree. The TOC can be used to pick the exact location to attach the data supplement. After the user has submitted the data supplement, the supplement can be viewed by selecting the document viewer 32, shown in FIG. 11 and then selecting the "data supplements" button 142 which produces a pop-up window 158 that identifies the supplement by name and identification number. The supplement name is a link that can be clicked-on to see the actual data supplement.

Figure 12:
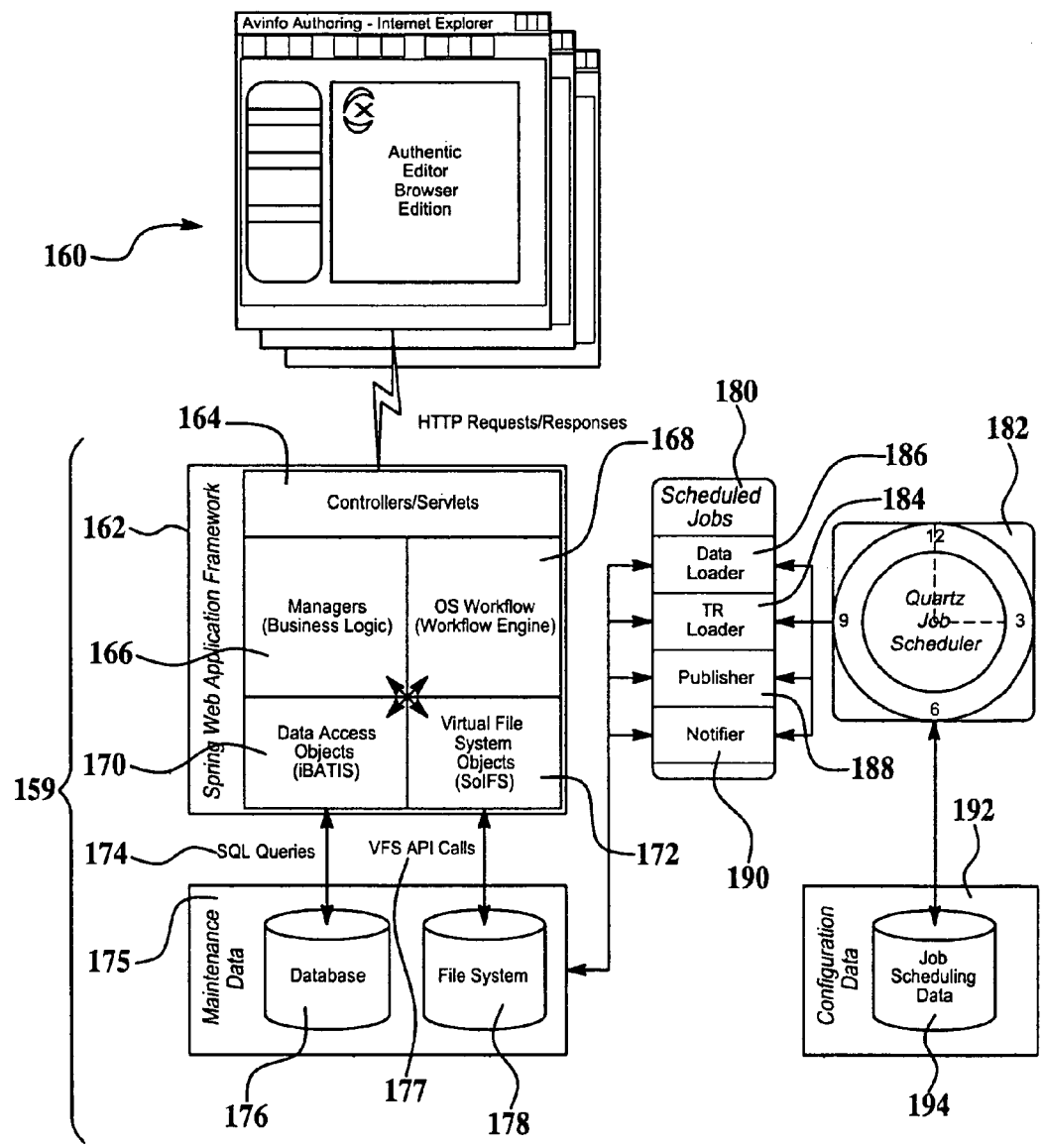
FIG. 12 is a block diagram showing the functional components of a system for creating, editing and managing changes in aircraft maintenance data, forming the performed embodiment of the invention.

Attention is now directed to FIG. 12 which shows the details of the MPT authoring module previously discussed. As already noted, the MPT is delivered from a host site 159 to users/customers in the form of a web application over a network such as the Internet. The user accesses the web application using a browser, which in the present example comprises the Authentic Editor browser edition available from Altova GMB in Vienna, Austria. The Authentic Editor browser addition is an XML and database content editor that allows users to enter data directly into XML documents and databases by simply filling in electronic forms using a word processor style interface.

As shown in FIG. 12, customer-user browsers 160 communicate using HTTP request/responses via a network such as the Internet to a hosted site 159 that includes the authoring web application that is based upon the Spring Web Application Framework 162. The Spring Web Application Framework 162 includes controllers/servlets 164, managers (business logic) 166, data access objects 170, OS workflow 168 and a virtual file system objects 172. The OS workflow engine 168 is embedded to provide workflow functionality so that when a user submits a change, an approval process is established that conforms with the workflow that has been dictated by the user. The Spring Web Application Framework has access to maintenance data 174 comprising an Oracle (relational) database 176 that contains, for example, descriptive data on maintenance tasks, and a file system 178 in which actual maintenance information is stored. The data access objects 170 communicate with the database 176 using SQL queries 175, and the virtual file system objects 172 communicates with the file system 178 using VFS API calls 177. Scheduled jobs 180 are delivered to a Quartz job scheduler 182 which schedules the jobs to occur at a particular data and time. The Quartz job scheduler 182 is open source software readily available from Open Symphony. The scheduled jobs 180 may include, by way of example, a data loader 184, TR loader 186, publisher 188 and notifier 190. In order to schedule jobs, the scheduler 182 may access configuration data 192 which includes job scheduling data 194.

From the foregoing, it will be appreciated that specific embodiments of the invention have been described herein for purposes of illustration, but that various modifications may be made without deviating from the spirit and scope of the invention. For example, aspects of the invention described in the context of particular embodiments may be combined or eliminated in other embodiments. Also, while the invention has been disclosed in connection with changing maintenance data for commercial airline fleets, it can also be applied to maintenance data for other transportation vehicles and other types of equipment. Further, while advantages associated with certain embodiments of the invention have been described in the context of those embodiments, other embodiments may also exhibit such advantages, and no embodiment need necessarily exhibit such advantages to fall within the scope of the invention. Accordingly, the invention is not limited, except as by the appended claims.

What is claimed is:

1. A method for managing maintenance data for aircraft using computer implemented software executing programmed instructions residing in memory, comprising the steps of:
   (A) authoring original maintenance data relating to the aircraft, said original maintenance data authored by an original equipment manufacturer (OEM), said authoring performed with a computer implemented XML editor executing programmed instructions residing in memory, said maintenance data only in a native format of Extensible Markup Language (XML), said maintenance data comprising XML documents and XML database content accessible by a relational database;
   (B) delivering a web application to an editing site over a network, said web application comprising an authoring module comprising said computer implemented XML editor, said web application comprising a tool for carrying out and managing maintenance services, said web application comprising executable programmed instructions stored in memory;
   (C) delivering the original maintenance data to the editing site in said XML format using the web application delivered in step (B);
   (D) allowing XML editing of the original maintenance data at the editing site, said editing performed with said computer implemented XML editor, said editing by a user of said web application, said editing of said XML documents and XML database content comprising said user manually entering data into an electronic form, said user comprising an end user of said original maintenance data, said user controlling with said XML editor access and distribution of said edited maintenance data to other end users of said edited maintenance data;
   (E) reconciling the edits made to the original maintenance data, using the web application delivered in step (B); and
   (F) publishing the edited maintenance data using the web application delivered in step (B) and allowing creation and management of task cards using a task module comprised by the tool, the task cards assisting in carrying out maintenance services and synchronizing with revisions to an airplane maintenance manual included in the edited XML documents.

2. The method of claim 1, wherein step (C) is performed using a web browser.

3. The method of claim 1, wherein step (B) is performed by transmitting the web application over the Internet.

4. The method of claim 1, further comprising the step of:
(G) storing the maintenance data edited in step (D).

5. The method of claim 4, further comprising the step of:
(H) reusing the edited maintenance data stored in step (G).

6. The method of claim 1, further comprising the step of:
(G) importing data relating to the equipment using the web application delivered in step (B), and
wherein step (D) includes using the imported data to perform the editing of the original maintenance data.

7. The method of claim 1, further comprising the step of:
(G) using the web application delivered in step (B) to notify users of edits to the original maintenance data made in step (D).

8. A method for creating and managing documents containing maintenance data for aircraft using computer implemented software executing programmed instructions residing in memory, comprising the steps of:
(A) creating original maintenance documents for the aircraft, said original maintenance data authored by an original equipment manufacturer (OEM), said original maintenance data comprising major maintenance documents only in a native format of Extensible Markup Language (XML), said maintenance data comprising XML documents and XML database content accessible by a relational database;
(B) delivering a web application to a user site over the Internet, said web application comprising a computer implemented XML editor executing programmed instructions residing in memory, said application comprising a tool for carrying out and managing maintenance services, said web application comprising executable programmed instructions stored in memory;
(C) delivering the original maintenance documents in said XML to the user site using the web application provided in step (B);
(D) allowing editing of the original maintenance documents at the user's site using said computer implemented XML editor, said editing by a user of said web application, said editing of said XML documents and XML database content comprising said user manually entering data into an electronic form, said user comprising an end user of said original maintenance data, said user controlling with said XML editor access and distribution of said edited maintenance data to other end users of said edited maintenance data; and
(E) importing data relating to the aircraft using the web application delivered in step (B), step (D) including using the imported data to perform editing of the original maintenance documents, and allowing gaining information about aircraft parts location and identification with a 3-D graphical model using a parts module comprised by the tool, the parts module being configured for integrating with a materials management system to obtain parts inventory information and the editing of the XML documents including editing the information accessed through the parts module.

9. The method of claim 8, wherein step (D) includes appending data to the maintenance documents.

10. The method of claim 8, wherein step (D) includes changing existing data in the maintenance documents.

11. The method of claim 8, further comprising the step of:
(F) reusing the maintenance documents edited in step (D).

12. The method of claim 8, further comprising using said web application to accomplish the steps of:
(F) scheduling the maintenance documents edited in step (D) to be published at a preselected time; and,
(G) publishing the edited maintenance documents at the time scheduled in step (F).

13. The method of claim 8, wherein step (C) is performed using a web browser.

14. The method of claim 8, further comprising using said web application to accomplish the steps of:
(F) reconciling the edits made to the original maintenance documents using the web application delivered in step (B); and
(G) publishing the edited maintenance documents using the web application delivered in step (B).

15. The method of claim 8, further comprising the step of:
(F) using the web application delivered in step (B) to notify users of edits to the original maintenance documents made in step (D).

16. The method of claim 8, further comprising the step of:
(F) reconciling the edits made in step (D).

17. A system for managing changes in maintenance data for aircraft, comprising:
a host website;
wherein aircraft maintenance data comprises original maintenance data authored by an original equipment manufacturer (OEM), said maintenance data is only in a native format of Extensible Markup Language (XML) and is deliverable from the host website to a user site, said maintenance data comprising XML documents and XML database content accessible by a relational database;
said user site connected to the host website by a network;
a web application comprising a computer implemented XML editor for editing the original maintenance data using XML, said web application deliverable from said host website over said network to said user site, said web application comprising a tool for carrying out and managing maintenance services, said web application comprising computer readable and executable programmed instructions stored in memory, the tool comprising a workflow engine for specifying a process for reviewing and approving the edited maintenance data; and,
a web browser at the user site, said web browser comprising computer readable and executable programmed instructions stored in memory and operable for receiving and viewing the web application over the network and editing the maintenance data using said computer implemented XML editor, said editing by a user of said web application, said editing of said XML documents and XML database content comprising said user manually entering data into an electronic form, said user comprising an end user of said original maintenance data, said web application operable to allow said user to control access and distribution of said edited maintenance data to other end users of said edited maintenance data;
a library that is accessible using the tool and includes an XML repository and a PDF repository, the XML documents being comprised by the XML repository along with aircraft graphics and aircraft technical records, the XML documents, graphics, and technical records being interlinked, the PDF repository including documents in PDF format and being linked with the XML repository; and
a structures module configured to allow management and maintenance of a repair history database that includes repair details, supporting documentation, and repair locations in spatial 3-D models, the structures module being linked to the library and providing access to the XML and PDF documents.

18. The system of claim 17, further comprising a computer implemented file storage for storing the maintenance data including said XML documents and XML database content, and wherein the maintenance data includes data describing maintenance tasks, and documents describing parts used in the maintenance of the aircraft, said file storage comprising computer readable and executable programmed instructions stored in memory.

19. The system of claim 17, said web application further comprising a scheduler for scheduling the publishing of the edited maintenance data at a preselected time.

20. The system of claim 17, wherein the web application includes Spring web application framework.

21. The system of claim 17, wherein the network comprises the Internet.

22. The method of claim 1, wherein said web application comprises software for performing and managing aircraft maintenance, said software comprising computer readable and executable programmed instructions stored in memory.

23. The method of claim 8, wherein said web application comprises software for performing and managing aircraft maintenance, said software comprising computer readable and executable programmed instructions stored in memory.

24. The system of claim 17, wherein said web application comprises software for performing and managing aircraft maintenance, software comprising computer readable and executable programmed instructions stored in memory.

\* \* \* \* \*